United States Patent [19]

Ishikawa et al.

[11] Patent Number: 5,209,701
[45] Date of Patent: May 11, 1993

[54] HUB UNIT BEARING APPARATUS WITH IMPROVED PRE-LOADING ARRANGEMENT

[75] Inventors: Shuuichi Ishikawa, Naka; Junshi Sakamoto; Hiroya Miyazaki, both of Fujisawa, all of Japan

[73] Assignee: Nikon Corporation, Tokyo, Japan

[21] Appl. No.: 801,869

[22] Filed: Dec. 3, 1991

[30] Foreign Application Priority Data

Dec. 7, 1990 [JP] Japan ................. 2-401769[U]

[51] Int. Cl.⁵ .................. F16C 13/00; F16C 43/04
[52] U.S. Cl. .................. 464/178; 301/105.1; 384/506; 384/544
[58] Field of Search ............... 464/198, 906; 384/448, 384/499, 502, 504–506, 543, 544, 570, 589; 301/6 R, 6 D, 105 R, 124 R, 124 H; 180/258, 259

[56] References Cited

U.S. PATENT DOCUMENTS

| | | | |
|---|---|---|---|
| 4,094,376 | 7/1978 | Welschof | 464/906 X |
| 4,493,388 | 1/1985 | Welschof et al. | 384/544 X |
| 4,765,688 | 8/1988 | Hofman et al. | 384/506 X |
| 4,804,233 | 2/1989 | Hofmann et al. | 464/906 X |

FOREIGN PATENT DOCUMENTS

| | | | |
|---|---|---|---|
| 65127 | 11/1982 | European Pat. Off. | 301/105 R |
| 2113723 | 2/1972 | Fed. Rep. of Germany | 301/105 R |
| 63-246677 | 10/1988 | Japan | |
| 64-28056 | 1/1989 | Japan | |
| 2198995 | 6/1988 | United Kingdom | 301/105 R |
| 8505661 | 12/1985 | World Int. Prop. O. | 301/105 R |

Primary Examiner—Daniel P. Stodola
Assistant Examiner—William G. Battista, Jr.
Attorney, Agent, or Firm—Shapiro and Shapiro

[57] ABSTRACT

A hub unit bearing apparatus for a vehicle, adapted to rotatably support a constant velocity joint and a wheel on a vehicle body and to connect them to each other, comprises an outer race attached to a vehicle body, a shaft extending from a constant velocity joint and having a first reduced diameter portion at its free end, a cylindrical hub fitted on the first reduced diameter portion and having one end which is near the constant velocity joint and on which a second reduced diameter portion is formed, an inner race fitted on the second reduced diameter portion and cooperating with the outer race via rolling members to construct a bearing, a first nut threaded on the second reduced diameter portion so as to protrude from an end face of the second reduced diameter portion axially and urging the inner race against a body portion of the hub, and a second nut threaded on the second reduced diameter portion and urging the hub, inner race and first nut against the constant velocity joint. A predetermined pre-load is applied to the bearing by the first nut, and the first nut is prevented from loosing by the second nut.

3 Claims, 3 Drawing Sheets

HUB UNIT BEARING APPARATUS WITH IMPROVED PRE-LOADING ARRANGEMENT

BACKGROUND OF THE INVENTION

1. Field of the Invention

The present invention relates to a hub unit bearing apparatus for rotatably supporting driving wheels of a motor vehicle (front wheels of an FF car, rear wheels of an FR car, front and rear wheels of a 4 WD car).

2. Related Background Art

In the past, in order to rotatably support driving wheels of a motor vehicle, various kinds of hub unit bearing apparatuses have been used (for example, refer to the Japanese Patent Laid-Open Nos. 63-246677 and 64-28056). An example of them is shown in FIG. 3.

In FIG. 3, a shaft 51 of a constant velocity joint 84 comprises a first inner toward the center of the vehicle, i.e., right side in FIG. 3) enlarged diameter portion 52, a first outer reduced diameter portion 53, and a first stepped portion 54 connecting these diameter portions. A male threaded portion 55 (shown diagrammatically) is formed on an outer peripheral surface of an outer end of the first reduced diameter portion 53 and a male spline groove portion 56 is formed on the peripheral surface of the remaining portion of the first reduced diameter portion 53.

A first flange 60 for supporting a wheel 58 constituting a vehicle wheel and a disc rotor 59 constituting part of a braking system is formed on an outer peripheral surface of a cylindrical hub 57 fitted on the shaft 51. Further, a female spline groove portion 61 capable of engaging the spline groove portion 56 is formed on an inner peripheral surface of the hub 57. A first inner race track 63 is directly formed on an outer peripheral surface of a second enlarged diameter portion 62 at an intermediate area of the hub 57. Further, an inner race 65 is fitted on a peripheral surface of a second reduced diameter portion 64 near an inner end of the hub 57, and a second inner race track 66 is formed on an outer peripheral surface of the inner race.

An inner end face (right end face in FIG. 3) of the inner race 65 is protruded inwardly more than an inner end face of the hub 57 and is abutted against the first stepped portion 54. Accordingly, the inner race 65 is sandwiched between the first stepped portion 54, and a second stepped portion 67 connecting the second enlarged diameter portion 62 to the second reduced diameter portion 64.

The male threaded portion 55 formed on the peripheral surface of the outer end of the shaft 51 of the constant velocity joint 84 is protruded outwardly from an outer end face of the hub 57, and a nut 68 is screwed on the protruded end of the threaded portion. As a result, the inner race 65, the hub 57 and a washer 69 are sandwiched between an inner end face of the nut 68 and the first stepped portion 54.

A cylindrical outer race 76 is disposed around the hub 57. A pair of outer race tracks 70 are formed in an inner peripheral surface of the outer race 76 in confronting relation to the above-mentioned first and second inner race tracks 63, 66, and a plurality of rolling members 71 are disposed between the respective inner and outer race tracks. A second flange 72 for mounting the outer race 76 onto a suspension system is formed on an outer peripheral surface of the outer race 76. Incidentally, the reference numeral 73 denotes a sensor rotor fitted on a portion of the shaft 51 of the constant velocity joint 84, and 74 denotes a rotational speed detecting sensor supported by an arm 75 of the suspension system of the vehicle body.

In the hub unit bearing apparatus having the above-mentioned construction, the rotation of the rolling members 71 permits the rotation of the hub 57, inner race 65 and shaft 51 inside the outer race 76. Further, the rotational speed of the hub 57 is detected by the rotational speed detecting sensor 74.

Also in the above-mentioned hub unit bearing apparatus, by using the single nut 68, not only the hub 57 is fixedly supported by the shaft 51 of the constant velocity joint 84, but also the inner race 65 is fixed to the hub 57. Thus, if the nut 68 is loosened, the inner race 65 is moved with respect to the hub 57, with the result that the hub 57 cannot be rotated smoothly. To avoid this, if the tightening torque for the nut 68 is increased to prevent the looseness of the nut, the pre-load acting on the bearing will be increased, thus shortening the service life of the rolling bearing assembled to rotatably support the hub 57 within the outer race 76.

For these reasons, in the past, the nut 68 was prevented from loosing and the pre-load of the bearing was adjusted by strict control of the tightening torque for the nut 58 during the assembling of the rotary members of the vehicle wheels. Thus, the assembling of the rotary members in the vehicle production line became troublesome.

SUMMARY OF THE INVENTION

A hub unit bearing apparatus according to the present invention is devised to eliminate the above-mentioned conventional drawbacks. That is to say, an object of the present invention is to provide a hub unit bearing apparatus wherein a predetermined pre-load can easily and surely be applied to the bearing and wherein such pre-load condition can be maintained effectively for a long time.

According to the hub unit bearing apparatus of the present invention, the prevention of the looseness of an inner race with respect to a hub and the adjustment of the pre-load are effected by a first nut threaded on a second male threaded portion. Prevention of the looseness of the first nut is effected by a second nut threaded on a first male threaded portion. Consequently, there is no risk that the first nut is loosened to move the inner race with respect to the hub.

DETAILED DESCRIPTION OF THE PREFERRED EMBODIMENTS

The present invention will now be explained in connection with preferred embodiments thereof with reference to the accompanying drawings.

Figure 1:
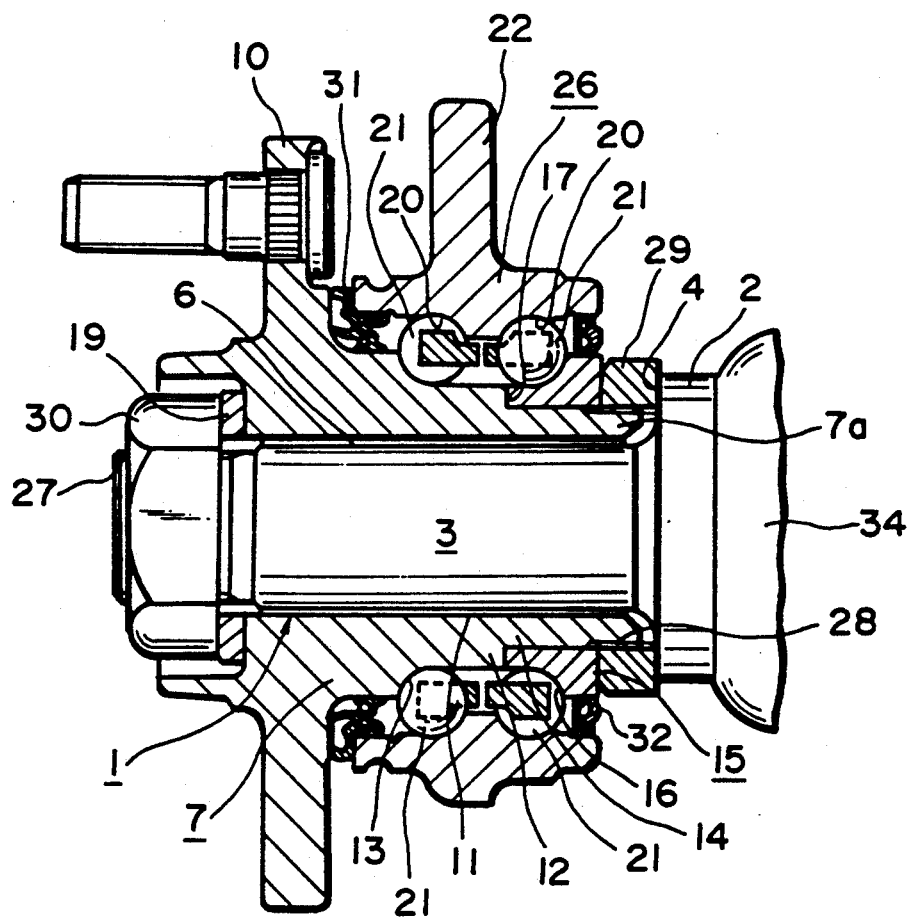
FIG. 1 is a sectional view of a hub unit bearing apparatus according to a first embodiment of the present invention.

In FIG. 1 showing a first embodiment of the present invention, a first enlarged diameter portion 2 formed on a shaft 1 of a constant velocity joint 34 inwardly (right) in an axial direction and a first outer reduced diameter portion 3 are interconnected by a first stepped portion 4. A first male threaded portion 27 is formed on an outer peripheral surface of an outer end of the first reduced diameter portion 3 and a male spline groove portion 6 is formed on the peripheral surface of the remaining portion of the first reduced diameter portion 3. A first flange 10 for supporting a wheel is formed on an outer peripheral surface of a cylindrical hub 7 fitted on the shaft 1. Further, a female spline groove portion 11 engaging the spline groove portion 6 is formed on an inner peripheral surface of the hub 7.

A first inner race track 13 is directly formed on an outer peripheral surface of a second enlarged diameter portion 12 at an intermediate area of the hub 7. Further, a second inner race track 16 is formed on an outer peripheral surface of an inner race 15 fitted on a peripheral surface of a second reduced diameter portion 14 near an inner end of the hub 7. A second male threaded portion 28 is formed on an outer peripheral portion of a portion 7a of the hub 7 protruding inwardly more than the inner race 15, and a first nut 29 is threaded on the second male threaded portion. Since a second stepped portion 17 is formed between the second enlarged diameter portion 12 and the second reduced diameter portion 14, the inner race 15 is sandwiched between the second stepped portion 17 and the first nut 29. In this way, the first nut 29 is screwed on the second male threaded portion 28 to secure the inner race 15, and an inner end face of the first nut is protruded inwardly more than an inner end face of the hub 7.

The first male threaded portion 27 formed on the peripheral surface of the outer end of the shaft 1 of the constant velocity joint 34 is protruded outwardly from an outer end face of the hub 7, and a second nut 30 is screwed on the protruded end of the threaded portion. As a result, the first nut 29, the inner race 15, the hub 7 and a washer 19 are sandwiched between an inner end face of the second nut 30 and the first stepped portion 4.

Figure 3:
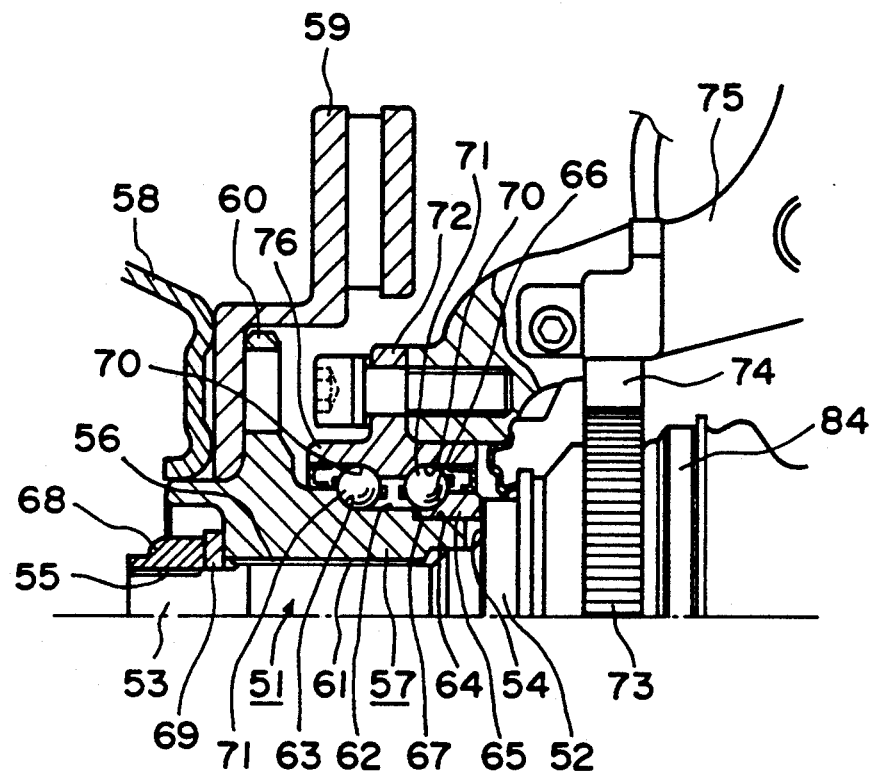
FIG. 3 is a sectional view of an upper half of a conventional hub unit bearing apparatus.

A cylindrical outer race 26 is disposed around the hub. A pair of outer race tracks 20 are formed in an inner peripheral surface of the outer race 26 in confronting relation to the above-mentioned first and second inner race tracks 13, 16, and a plurality of rolling member 21 are disposed between the respective inner and outer race tracks. On the other hand, a second flange 22 for mounting the outer race 26 onto a suspension system of the vehicle body (see FIG. 3), is formed on an outer peripheral surface of the outer race 26. A pair of seal members 31, 32 are disposed inside of an inner peripheral surface of the outer race 26 at the outer and inner ends thereof to prevent dirt and the like from entering between the rolling members 21.

Similar to the above-mentioned conventional apparatus, in the hub unit bearing apparatus according to this embodiment, due to the rotation of the rolling members 21 disposed between the first and second inner race tracks 13, 16 and the pair of outer race tracks 20, the hub 7, inner race 15, nut 29, shaft 1 and nut 30 are integrally rotated with respect to the outer race 26.

The prevention of the rotation of the inner race 15 with respect to the hub 7 and the adjustment of the pre-load for the bearing (13, 16, 20, 21) during the assembling of the inner race 15 and outer race 26 onto the hub are effected by tightening the first nut 29 with respect to the second male threaded portion 28. Now, since the tightening of the first nut 29 can be effected in the automated bearing assembling line in the factory, it is possible to easily adjust the exact torque required for applying the proper pre-load to the rolling bearing.

After the assembly of the inner race 15, outer race 26 on the hub 7 is attached to the shaft 1, the prevention of the looseness of the first nut 29 is effected by tightening the second nut 30 with respect to the first threaded portion 27. Since the tightening torque of the second nut 30 does not influence upon the adjustment of the pre-load of the bearing, the tightening torque of the second nut 30 can be increased enough to substantially prevent looseness of the first and second nuts 29, 30, with the result that the looseness of the inner race 15 with respect to the hub can surely be prevented while maintaining the proper pre-load of the bearing. The second nut 30 can easily be tightened with the greater torque in the vehicle assembling line without strictly controlling the torque.

Figure 2:
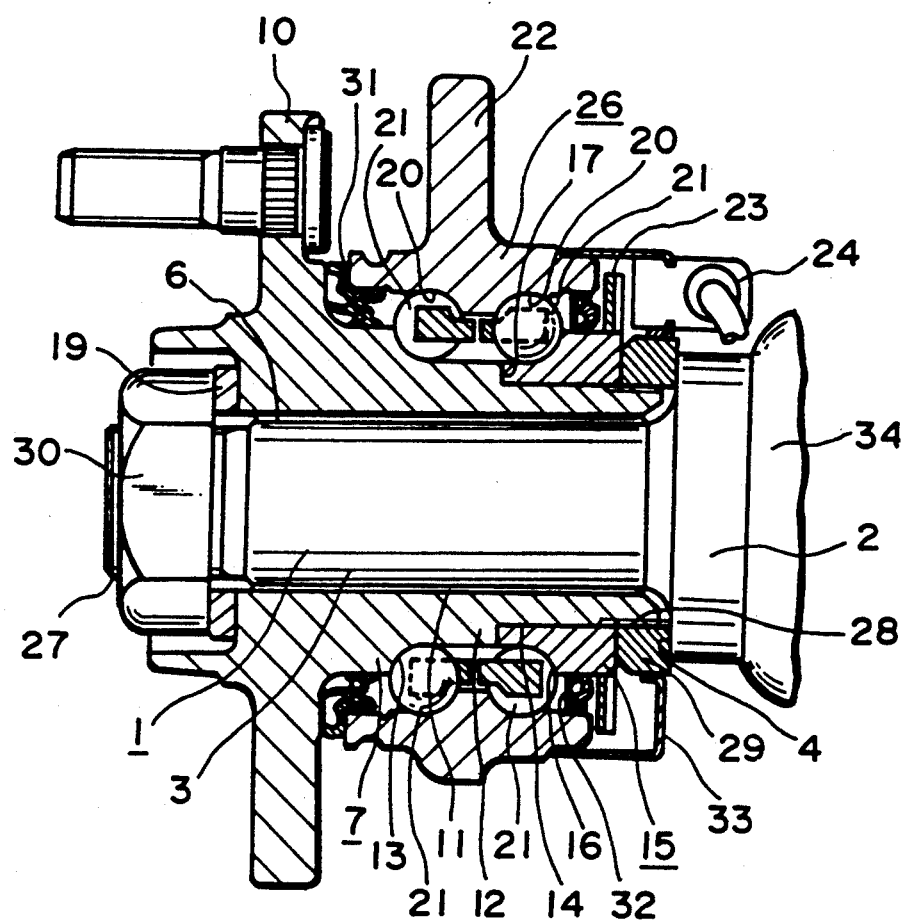
FIG. 2 is a sectional view of a hub unit bearing apparatus according to a second embodiment of the present invention.

Next, a second embodiment of the present invention will be explained with reference to FIG. 2.

In this embodiment, in addition to the arrangement of the aforementioned first embodiment, a sensor is provided for detecting the rotational speed of the hub 7. More particularly, a sensor rotor 23 is secured on the outer peripheral surface of the inner race 15, and a rotational speed detecting sensor 24 is supported by a dust cover 33 secured to the inner end of the outer race 26. With this arrangement, not only the same technical advantages as those of the first embodiment can be obtained, but also the rotational speed of the hub 7 can be detected by the rotational speed detecting sensor 24.

What is claimed is:

1. A hub unit bearing apparatus rotatably supporting a constant velocity joint (34) and a wheel (58) on a vehicle body, comprising:

a shaft (1) extending from the constant velocity joint (34) and having a first reduced diameter portion (3) at free end thereof;

a cylindrical hub (7) fitted on said first reduced diameter portion of said shaft and having one end which is near said constant velocity joint and on which a second reduced diameter portion (14) is formed, and having another end connected to the wheel;

a bearing including an outer race (26) attached to the vehicle body, rolling members (21), and an inner race (15) fitted on said second reduced diameter portion of said hub and cooperating with said outer race through said rolling members;

a first nut (29) threaded on said second reduced diameter portion of said hub so as to protrude from an end face of said second reduced diameter portion axially and urging said inner race against a body portion f said hub; and a second nub (30) threaded on said first reduced diameter portion of said shaft and urging said hub, said inner race and said first nut against said constant velocity joint;

wherein a predetermined pre-load is applied to said bearing by said first nut, and said first nut is prevented from loosening by a force applied by said second nut.

2. A hub unit bearing apparatus according to claim 1, wherein said bearing further includes an inner race track (13) formed on said body portion of said hub adjacent to said inner race, further rolling members, and an outer race track (20) formed on said outer race in confronting relation to said inner race track and cooperating with said inner race track through said further rolling members.

3. A hub unit bearing apparatus comprising:
- a shaft (1) of a constant velocity joint having a first enlarged diameter portion (2), a first reduced diameter portion (3) and a first stepped portion (4) connecting said first enlarged and reduced diameter portions to each other;
- a first male threaded portion (27) formed on an outer peripheral surface of an outer end of said first reduced diameter portion;
- a cylindrical hub (7) having an outer peripheral surface on which a first flange (10) for supporting a vehicle wheel is formed;
- a first inner race track (13) directly formed on an outer peripheral surface of a second enlarged diameter portion (12) of said hub at an intermediate portion thereof;
- an inner race (15) fitted on an outer peripheral surface of a second reduced diameter portion (14) of said hub at an inner end thereof;
- a second inner race track (16) formed on an outer peripheral surface of said inner race;
- a second male threaded portion (28) formed on the outer peripheral surface of said hub at the inner end thereof;
- a first nut (29) threaded on said second male threaded portion to sandwich said inner race between said first nut and a second stepped portion (17) formed between said second enlarged and reduced diameter portions, and having an inner, end face protruding inwardly more than an said inner end face of said hub;
- an outer race (26) having an inner peripheral surface on which a pair of outer race tracks (20) are formed in confronting relation to said first and second inner race tracks and an outer peripheral surface on which a second flange (22) for supporting said outer race by a suspension system is formed; and
- a second nut (30) threaded on said first male threaded portion to sandwich and secure said first nut, inner race and said hub between said second nut and said first stepped portion.

* * * * *

UNITED STATES PATENT AND TRADEMARK OFFICE
CERTIFICATE OF CORRECTION

PATENT NO. : 5,209,701
DATED : May 11, 1993
INVENTOR(S) : Shuuichi Ishikawa, et. al.

It is certified that error appears in the above-indentified patent and that said Letters Patent is hereby corrected as shown below:

On the Title page, item [73], Assignee: should read --NSK Ltd., Tokyo, Japan--.

Signed and Sealed this

Fifth Day of April, 1994

Attest:

BRUCE LEHMAN

*Attesting Officer*   *Commissioner of Patents and Trademarks*